324-77.
02-08-72    XR    3,641,515

United States Patent
Sues

[15] 3,641,515
[45] Feb. 8, 1972

[54] SPECTRUM ANALYZER

[72] Inventor: Lawrence B. Sues, Rome, N.Y.

[73] Assignee: The United States of America as represented by the Secretary of the Air Force

[22] Filed: Sept. 10, 1970

[21] Appl. No.: 70,971

[52] U.S. Cl. .................................340/173 R, 324/77 C
[51] Int. Cl. .........................G11c 21/00, G01r 23/02
[58] Field of Search..................324/77 A, 77 B, 77 C, 77 CS, 324/77 D; 325/332, 333, 336, 363; 340/173 R

[56] References Cited

UNITED STATES PATENTS 3,173,087   3/1965   Loposer..............................324/77 X Primary Examiner—Stanley M. Urynowicz, Jr.
Attorney—Harry A. Herbert, Jr. and George Fine

[57] ABSTRACT

A spectrum analyzer is provided in which a digital recirculating delay line memory is used in conjunction with a swept receiver to effect a time variant signal across a frequency range of interest. The swept receiver is fed analog signals for subsequent analog to digital conversion. Thereafter, a logic circuit simultaneously associated with a delay line memory, sweep receiver circuit and computer receives the converted digital signals. The logic circuit and an analog to digital converter are simultaneously controlled by a common clock. The logic circuit synchronizes the receiver sweep to the recirculating memory and the digital recirculating memory stores in digital format for future utilization the spectral characteristics of the frequency range of interest.

4 Claims, 1 Drawing Figure

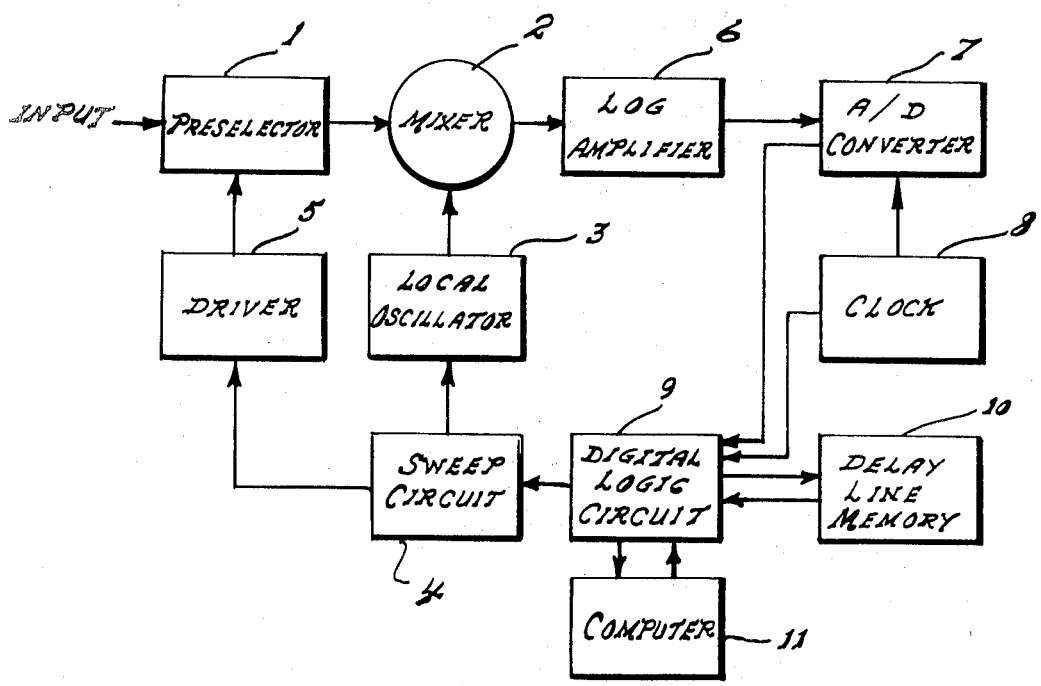

3,641,515

SPECTRUM ANALYZER

BACKGROUND OF THE INVENTION

This invention relates to spectrum analyzers and more particularly to spectrum analyzers receiving signals of interest in analog form for conversion to a digital format for subsequent processing to provide the spectral characteristics of the frequency range of interest.

In many surveillance systems it is desirable to obtain a spectrum analysis of electromagnetic signals utilized for jamming radar and communications. Invariably the signals of interest are in analog form and generally the signal variations are of rapid occurrence at rates considerably in excess of a human operator using conventional spectrum surveillance equipment. Further the signals of interest may range over a wide frequency range and limitations exist in the prior art in the capability of automatic monitoring thereof. Still further many advantages would be derived from the ability to convert analog signals of interest to a digital format thus permitting inputting to digital devices such as computing machines or digital recorders.

The present invention provides swept electromagnetic spectrum surveillance equipment with an output suitable for use with digital information processing systems. Some of the advantages of this spectrum analyzer are that signal variations of rapid occurrence are efficiently detected and the output format is compatible with digital data processing equipment and with digitally programmed receivers. This invention is suitable for use in passive electronic reconnaissance and in electromagnetic compatibility instrumentation.

SUMMARY OF THE INVENTION

A spectrum analyzer is provided which includes a swept frequency receiver being fed analog signals of interest. The output of the receiver are converted to representative digital signals, by an analog to digital converter. A computer is utilized to initiate the start of the receiver sweep by means of a programmed pulse therefrom through a logic circuit to a sweep circuit incorporated as part of the receiver. A recirculating delay line memory is associated with the logic circuit and receives the digital information therefrom for purposes of storage and further utilization. The analog to digital converter, the logic circuit and in turn the delay line memory are controlled by a common clock for synchronization purposes. By programmed command of the computer, the stored digital information representative of the spectral characteristics of the analog signal may be read out from the recirculating digital delay line to the computer for further processing or comparison to other similar stored preceding signals for detection of variations between signals.

An object of this invention is to provide a spectrum analyzer receiving an analog signal and providing an improved method for obtaining the spectrum characteristics in digital format.

Another object of this invention is to provide a spectrum analyzer including a digital recirculating delay line memory operating in conjunction with a swept receiver to effect a time variant signal across a frequency range of interest.

Yet another object of this invention is to provide a spectrum analyzer using a digital recirculating memory to store a digital format the spectral characteristics of the frequency range of interest.

Still another object of this invention is to provide a spectrum analyzer in which a receiver sweep is synchronized to a recirculating memory for use with fixed delay memories.

A further object of this invention is to provide a spectrum analyzer wherein stored spectral data is used for online comparison to subsequent spectral activity by digital circuitry to generate discrete signals when a variation of activity in the frequency range being analyzed occurs.

DESCRIPTION OF DRAWINGS

There is shown a single FIGURE illustrating in block diagram form the spectrum analyzer of the present invention.

DESCRIPTION OF PREFERRED EMBODIMENT

Referring in detail to the single FIGURE of the present invention, there is shown preselector 1 receiving at input 1a an analog electromagnetic signal such as from a jammer, radar or communications network. Preselector 1 is arranged so as to be automatically tunable over a predetermined frequency range by a sweep voltage signal applied to input 5. Preselector 1 is conventional and may be electromagnetically tuned by conventional ferromagnetic means. The output of preselector 1 is fed to log amplifier 6 by way of mixer 2 thus providing a preselected intermediate frequency. It is noted that mixer 2 receives a local oscillator signal from local oscillator 3 which is a voltage controlled oscillator which may be varied in frequency also over a predetermined frequency range by applied sweep voltage signal. Sweep circuit 4 is utilized to provide a common predetermined sweep voltage signal to be applied to both preselector 1 and local oscillator 3. The aforesaid predetermined sweep voltage signal is applied to preselector 1 by way of driver 5. Sweep circuit 4 is designed to receive an initiating signal from logic circuit 9 to start each sweep voltage signal. Thus, local oscillators and preselector 1 are simultaneously and automatically tuned over a predetermined frequency range by a common sweep voltage signal initiated at a predetermined time. The combination of preselector 1, mixer 2, local oscillator 3, sweep circuit 4 and driver 5 comprises an automatically tuned swept receiver.

Log amplifier 6 is utilized to provide a greater dynamic range and the output thereof are analog signals. Analog to digital converter 7 receives analog signals from log amplifier 6 and provides at the output thereof representative digital signals. Analog to digital converter 7 receives a timing signal from clock 8 thereby permitting a predetermined sampling from analog to digital converter 7. The digital signals representative of the input analog signals are fed to digital logic circuit 9. Clock 8 also controls digital logic circuit 9 and thus at a predetermined time the digital signals are fed from logic circuit 9 to recirculating delay line memory 10. Thus clock 8 also controls by way of digital logic circuit 9 the operation of delay line memory 10.

Digital computer 11 is programmed so that a predetermined pulse therefrom is transmitted to digital logic circuit 9 which will provide a start pulse to sweep circuit 4. Thereupon preselector 1 and local oscillator 3 will automatically sweep over a predetermined frequency range to effect a swept receiver operation. The output from clock 8 synchronizes the operation of analog to digital converter 7, digital logic circuit 9, and recirculating delay line memory 10. The serial memory of delay line 10 now in digital form stores the amplitude of frequency spectrum of interest. Computer 11 is also programmed so that at a predetermined command the stored digital information may be read out to computer 11 for rapid utilization thereof. Computer 11 is also programmed to store preceding digital signals of interest to compare against subsequent digital signals of interest and thus permit the use of stored spectral data for online comparison to subsequent spectral activity to generate discrete signals when a variation of the activity in the frequency range being analyzed occurs. It is noted that digital logic circuit 9 is conventional and may be of the type associated with a conventional digital computer such as computer 11. In the alternative digital logic circuit 9 may be associated with delay line memory 10 which combination is conventional as manufactured and sold by Andersen Co.

It is emphasized the present invention may be utilized as a signal activity processor to provide swept electromagnetic spectrum surveillance equipment with an output for use with digital information processing systems. The unique advantages of this processor are that signal variations of rapid occurrence are efficiently detected at rates considerably in excess of the capability of a human operator using conventional spectrum surveillance equipment and that the output format is compatible with digital data processing equipment and with digitally programmed receivers.

It is also noted that this invention used as a signal activity processor is readily adaptable to sequential detection processes using variable signal observation periods. When used in this manner, the output of the sequential detector would also serve as the clock for digital circuitry and a shift register would be used for the delay line memory.

I claim:

1. A spectrum analyzer comprising a swept receiver being fed analog electromagnetic signals of interest, said swept receiver being automatically tunable over a predetermined frequency range, means to convert the analog output signals from said swept receiver to representative digital signals, recirculating delay line means, a digital logic circuit receiving said representative digital signals from the analog to digital converting means for predetermined timed storage in said recirculating delay line means, common clock means for said analog to digital converting means and said digital logic circuit for synchronizing their operation and in turn that of said recirculating delay line means for predetermined time serial storage of the digital signals, a sweep circuit providing a predetermined sweep voltage signal for application to said swept receiver for automatic tuning thereof over said predetermined frequency range, and a digital computer programmed to transmit a predetermined timed signal by way of said digital logic circuit to said sweep circuit for initiation of said application of said predetermined sweep voltage signal to said swept receiver, said digital computer also being programmed to issue a command by way of said digital logic circuit to said recirculating delay line means to read out thereto the stored digital signals for further utilization thereof.

2. A spectrum analyzer as described in claim 1 further including a log amplifier interconnecting said swept receiver and said analog to digital receiver to provide a wide dynamic range.

3. A spectrum analyzer as described in claim 2 wherein said swept receiver is comprised of means receiving said analog electromagnetic signals, said means being automatically tunable over a predetermined frequency range upon the receipt of said sweep voltage signal from said sweep circuit a mixer interconnecting said tunable receiving means and said log amplifier, a voltage controlled local oscillator tunable over a predetermined frequency range also upon the receipt of said sweep voltage signal from said sweep circuit.

4. A spectrum analyzer as described in claim 3 including a driver receiving said sweep voltage signal from said sweep circuit prior to the application to said tunable receiving means.

* * * * *